(12) United States Patent
Logan et al.

(10) Patent No.: US 7,380,126 B2
(45) Date of Patent: May 27, 2008

(54) METHODS AND APPARATUS FOR CONTROLLING THE TRANSMISSION AND RECEIPT OF EMAIL MESSAGES

(76) Inventors: James D. Logan, 81 Castle Hill Rd., Windham, NH (US) 03087; Charles G. Call, 68 Horse Pond Rd., West Yarmouth, MA (US) 02673

( * ) Notice: Subject to any disclaimer, the term of this patent is extended or adjusted under 35 U.S.C. 154(b) by 967 days.

(21) Appl. No.: 10/160,708

(22) Filed: May 31, 2002

(65) Prior Publication Data

US 2002/0181703 A1    Dec. 5, 2002

Related U.S. Application Data

(60) Provisional application No. 60/292,826, filed on Jun. 1, 2001.

(51) Int. Cl.
*H04L 9/00* (2006.01)
*H04K 1/00* (2006.01)
*G06F 15/16* (2006.01)

(52) U.S. Cl. ............ 713/176; 713/155; 713/181; 705/51; 705/64; 705/406; 709/206; 726/1; 726/26

(58) Field of Classification Search ............ 713/176, 713/161–612
See application file for complete search history.

(56) References Cited

U.S. PATENT DOCUMENTS

| | | | | |
|---|---|---|---|---|
| 5,999,967 A * | 12/1999 | Sundsted | .......... | 709/206 |
| 6,115,735 A * | 9/2000 | Saito | .......... | 709/200 |
| 6,145,079 A * | 11/2000 | Mitty et al. | .......... | 713/170 |
| 6,327,656 B2 * | 12/2001 | Zabetian | .......... | 713/176 |
| 6,640,301 B1 * | 10/2003 | Ng | .......... | 713/156 |
| 6,820,202 B1 * | 11/2004 | Wheeler et al. | .......... | 713/185 |
| 6,829,635 B1 * | 12/2004 | Townshend | .......... | 709/206 |
| 6,848,048 B1 * | 1/2005 | Holmes | .......... | 713/162 |
| 7,188,358 B1 * | 3/2007 | Hisada et al. | .......... | 726/2 |
| 2002/0116463 A1 * | 8/2002 | Hart | .......... | 709/206 |
| 2002/0120600 A1 * | 8/2002 | Schiavone et al. | .......... | 707/1 |
| 2002/0169954 A1 * | 11/2002 | Bandini et al. | .......... | 713/153 |

* cited by examiner

*Primary Examiner*—Ayaz Sheikh
*Assistant Examiner*—Trang Doan
(74) *Attorney, Agent, or Firm*—Charles G. Call

(57) ABSTRACT

Methods and apparatus for identifying unwanted email messages by transmitting metadata with an outbound email message that indicates the total number of email messages sent by that sender in a predetermined time period, or alternatively indicates the total number of email messages which are equivalent to the outgoing message that have been sent. In addition the metadata may include an identification of the sender and a "pledge" made byte sender. A pledge may take the form of a binding commitment from the sender that the information contained in the metadata is accurate, and/or that the sender promises to abide by predetermined good conduct rules designed to limit unwanted email. The outgoing message may be further signed by the sender with a digital signature that provides means for verifying the content of the message and the pledge as well as the identity of the sender.

13 Claims, 2 Drawing Sheets

METHODS AND APPARATUS FOR CONTROLLING THE TRANSMISSION AND RECEIPT OF EMAIL MESSAGES

CROSS-REFERENCE TO RELATED APPLICATION

This application claims the benefit of the filing date of the U.S. Provisional Patent Application Ser. No. 60/292,826 filed on Jun. 1, 2001.

FIELD OF THE INVENTION

This invention relates to electronic communication systems and more particularly to systems for controlling unwanted email.

BACKGROUND OF THE INVENTION

The transmission of unsolicited and unwanted email messages ("SPAM") seriously detracts from the utility of the email system. Although many methods have been devised which attempt to block or segregate SPAM without affecting desired messages, those methods have not been successful. As long as there are no serious legal consequences to the transmission of SPAM, the practice can be expected to continue to grow, placing ever increasing burdens on email system users.

The present invention is predicated on a number of related observations:

The bulk of unwanted email consists of substantially the same message being sent to very large numbers of people. If an incoming email could reliably indicate, in some way, how many different addressees were receiving the same message, it would be possible to usefully identify and segregate unwanted email that was being mass-mailed to large numbers of other recipients.

If there was a way in which persons who transmit unsolicited email to large numbers of people could be subjected to potential civil or criminal liability in a way that does not require legislation that might impair freedom of speech, the risk of sending improper email could be made to outweigh the monetary rewards that now stimulate the growth of SPAM.

SUMMARY OF THE INVENTION

The present invention provides a mechanism for identifying email messages that are being sent to large numbers of different people, or that otherwise violate defined rules of good conduct which, if observed, would significantly alleviate the burdens SPAM now creates. In addition, the present invention uses an encryption mechanism for tagging outgoing email with metadata that can impose legal liability, both civil and criminal, on those who attempt to misuse or circumvent the system.

In a principal aspect, the present invention takes the form of methods and apparatus for controlling unsolicited and unwanted email messages ("SPAM") by transmitting metadata along with an outgoing email message that identifies the sender of the message and contains an indication of the number of copies of the outgoing message, or its equivalent, that have been sent to others. At the receiving location, the added metadata is used to identify, sort, filter or otherwise process incoming email to distinguish unwanted email which is sent to a large number of different addressees from low-volume transmissions that are less likely to be SPAM.

The metadata sent with the outgoing email may further manifest a legally binding promise by the sender that the transmitted email conforms to one or more rules of good conduct, such as a promise that this message or an equivalent is not being sent to more than a predetermined threshold number of other recipients. The transmission of email by a sender that does not conform to the promise subjects the sender to civil liability to those who rely on the promise.

To assure the integrity of both the message and the associated anti-spam metadata, the outgoing email may be signed with an encrypted digital signature using the public key infrastructure, with the digital signature being validated at the receiving location using a digital certificate issued to the sender by a certification authority in reliance on the sender's binding commitment not to use the supplied certificate to sign outgoing email that does not conform to predetermined good conduct rules. An attempt to circumvent or misuse the digital signatures can subject the perpetrator to criminal liability under the Digital Millennium Copyright Act.

DETAILED DESCRIPTION

Internet email operates in a manner specified by a group of RFC (Request for Comment) documents published by the IETF (Internet Engineering Task Force). These standards documents include RFC822, published in 1982, which describes the current standard for Internet email messages and specifies how email messages need to be formatted when transmitted from host to host. Chapter 5 of RFC 1123 published in 1990 contains additional specific information about email standards. As specified in RFC822, the content of an email message is limited to US-ASCII characters. In order to transmit more complex data, including an expanded character set used by other languages as will as binary data such as computer programs and multimedia data files, a series of RFCs was published in 1996 which defined the MIME protocol: RFC2045 through RFC2049. These and other RFC documents are freely available on the Internet from many sources, including the IETF web site at http://www.ietf.org/rfc.html. The email protocols are further described in detail in *Internet Email Protocols, A Developer's Guide,* by Kevin Johnson, Addison-Wesley 2000, ISBN 0-201-43288-9.

As described in the references noted above, email is managed by MTAs (Mail Transfer Agents), MDAs (Mail Delivery Agents) and MUAs (Mail User Agents). MTAs and MDAs are responsible for routing and transporting email messages while MUAs are responsible for providing an interface to users. The SMTP (Simple Mail Transfer Protocol) is used to handle the transmission of email between machines, and the POP (Post Office Protocol) and IMAP (Internet Message Access Protocol) permits a MUA to read email that resides on a remote machine, typically operated by the user's ISP (Internet Service Provider). As described below, the present invention may be implemented by extending the capabilities of MUAs with the goal of controlling unsolicited and often unwanted email, commonly called "SPAM."

The invention employs a first mechanism for tagging each outgoing email message by adding metadata to the message at the sending MUA, and a second mechanism at the receiving MUA for filtering or sorting incoming email based in part on the added metadata.

Figure 1:
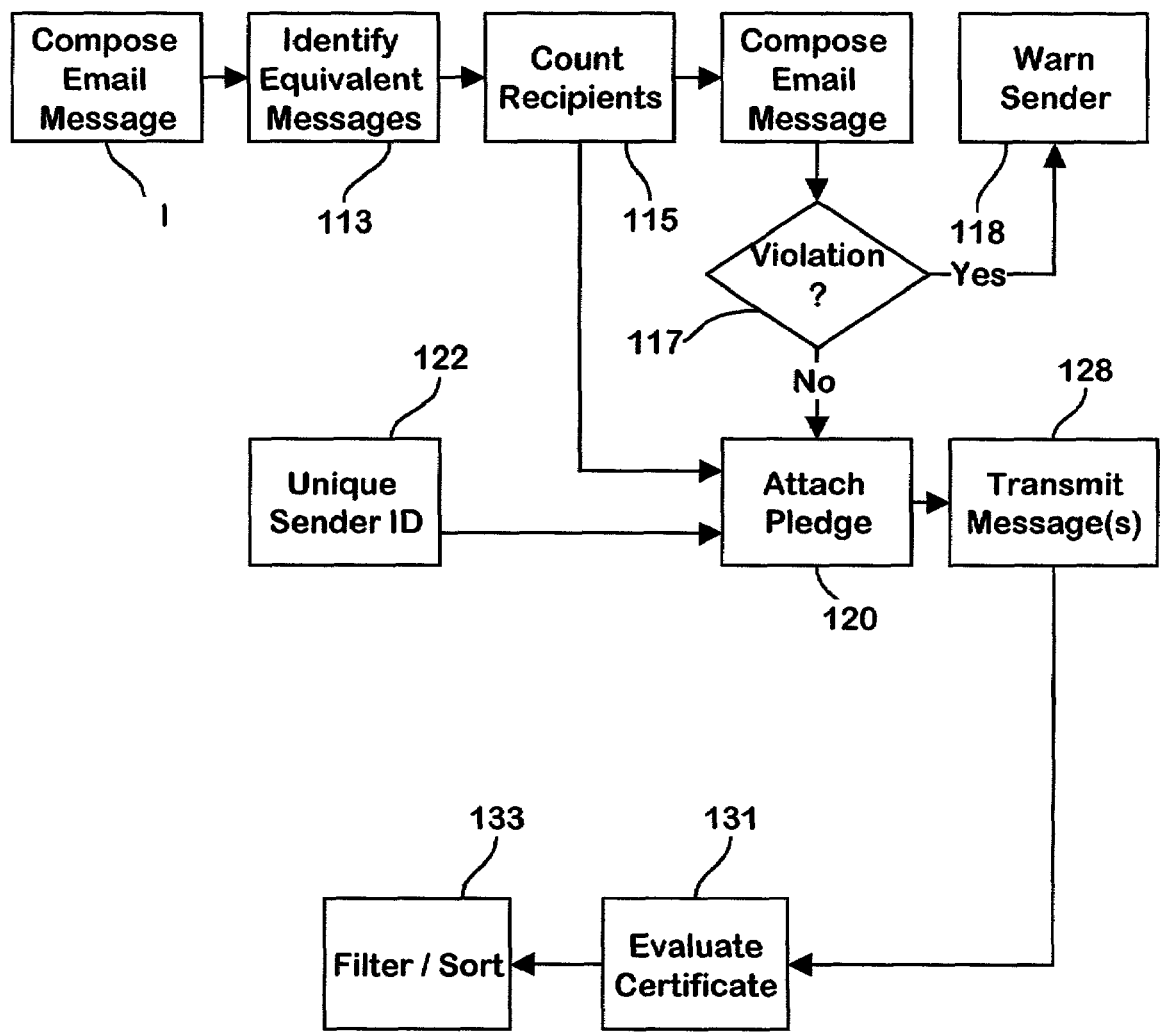
FIG. 1 is a functional block diagram illustrating the steps performed in sending an email message with metadata characterizing the message in order to better control unsolicited and unwanted email.

As shown in FIG. 1, the sending MUA includes a source of a conventional email message 111, which is typically a client program running on a personal computer that incorporates a text editor for composing the email message. Commercially available client programs of this kind include the Microsoft Outlook, Netscape Communicator, and Eudora email client programs. The additional functionality contemplated by the present invention may be added as an integral part of such client programs, or may take the form of a separate "proxy" program that processes incoming and/or outgoing email messages generated by such programs.

As seen in FIG. 1, the outgoing email message from the source 111 is first compared at 113 with retained copies of previously transmitted messages to identify equivalent messages. The comparison method used should identify any prior message which contains all of a significant portion of the outgoing message, excluding predetermined "boilerplate" such standard letterhead data or a standard closing which the user may wish to include in many outgoing messages. In addition, previously transmitted messages sent more that a predetermined time duration earlier than the current time may be ignored with the result that "equivalent messages" may comprise only those messages having a significant amount of common content transmitted within a predetermined prior time interval.

The definition of what constitutes an "equivalent" message is preferably a predetermined published standard. As described later, metadata attached to the outgoing message may constitute a contractually binding promise by the sender to the recipient that no more than a specified number of "equivalent" messages have been transmitted to others. For this reason, the method of identifying equivalent messages should use the published standard to so that the meaning of "equivalent" is definite and mutually understood.

After previously transmitted equivalent messages have been identified, the number of recipients of the current outgoing message is added to the number of recipients identified in each of the equivalent messages, thereby forming a "copy sent" count for the outgoing message as shown at 115. The count value is then compared with a predetermined threshold value at 117. If the total copies sent count exceeds the threshold, indicating a rule violation, the sender is notified with a warning message that informs the sender that an excessive number of copies has been detected, giving the user the opportunity to change the number of copies sent or substitute different message content before the message is transmitted. If the use desires to send the message without modification, it will be sent without additional metadata.

If the message does not violate the rule; that is, if more than a predetermined threshold number of copies of this or an equivalent message have not been transmitted within a predetermined past time interval, metadata here called a "pledge" is added to the outgoing message at 120. The pledge preferably includes the following metadata: (1) an identifier called a Sender ID which uniquely identifies the sender obtained from the source 122; and (2) an indication of the number of other recipients to whom this message (or its equivalent) has been sent, or an indication that less than a predetermined threshold number of other recipients have been sent a copy of this or an equivalent message. The pledge metadata may be added to the body of the email using a unique format, such as:

"<*:PLEDGE Frederick W. Mayfield LESS THAN 5:*>"

Alternatively, the pledge may take the form of an "attachment" binary file having a predetermined internal format and having a filename with a predetermined file type suffix (such as ".crt") transmitted with the email in accordance with the standard MIME protocol.

An alternative method would simply count the number of email messages a given person or entity sends in a predetermined time period. Thus, while the average person seldom sends more than fifty messages per day, a SPAM sender typically transmits thousands of messages. Thus, the pledge may simply provide an assurance that the sender has sent less than a predetermined threshold number of messages, regardless of content, during a given time period. This approach effectively distinguishes messages on the basis of the characteristics of the sender and does not require the identification of "equivalent" messages.

At the receiving MUA, the incoming email may be filtered, sorted and/or identified based in part on the presence (or absence) of accompanying pledge metadata. In order to facilitate the review of email, a pledge which is imbedded in or attached to incoming mail may be identified and evaluated as indicated at 131 in FIG. 1, and the incoming messages may then be filtered, sorted or otherwise categorized at 133 to distinguish email which does not include a pledge from email that does, and further categorizing email messages that include a pledge based on the stated number of copies sent to others, or based on the stated identity of the sender.

It may be noted that the "sender" as that term is used herein may be the actual sender that composes the email, or may be an Internet Service Provider or other email handling entity acting on behalf of, and vouching for, the sender.

The integrity of a pledge as an indication of both the source and character of the associated message may be assured by "signing" the outgoing message and pledge with a digital signature using the public key infrastructure (PKI). Digital signatures have been and continue to be widely used to identify senders and to thereby prevent impersonators from perpetrating frauds. To control SPAM, the digital signature does more than simply identify the sender: it also confirms the authenticity of an enforceable "promise" by the signer that the message has been sent to no more than the number of recipients indicated in the pledge, and/or that message otherwise complies with a predetermined "good conduct" policy.

The pledge can be of different types. For example, a first type would be used for conventional email communications and would assure the receiver, for that: (1) no more than a predetermined threshold number of copies (e.g., no more than five) of the message or its equivalent have been sent; and (2) the message does not solicit business or advertise any product. This first type of pledge may be designated in the pledge itself, for example, by the character string "LESS THAN 5" in the foregoing example of an imbedded pledge.

A second illustrative pledge type might indicate that this sender had sent fewer than a stated number of emails (regardless of their content) in a predetermined time period; for example, that the pledge type would indicate that fewer that 50 emails per day have been sent sent.

A third illustrative pledge type might instead indicate: (1) that the message was being sent in response to a prior request or authorization from the recipient, (2) that the authorization was being kept on file by the sender and was authenticated by the digital signature of the requester; and (3) that no further messages would be sent upon the receipt of a cancellation request from the subscriber to remove his or her name from the distribution list.

A fourth illustrative pledge type might be used by for unsolicited email and would simply indicate the sender's promise to place the recipient's email address on a "do not send" list on request, and to send no further unsolicited or unauthorized email to the recipient thereafter.

The digital signatures used to authenticate the message and pledge would be issued by one or more authorized certification authorities (CAs) who would issue digital certificates containing the sender's public key only to senders who agreed to obey the anti-spam rules stated in a policy for certificates of a particular type. To make this work easily, software routines (components) could be provided to independent software vendors that market email client software (e.g. Microsoft Outlook, Netscape Communicator, Eudora, etc.). These components would operate in the manner illustrated in FIG. 1, automatically attaching or imbedding a metadata pledge in outgoing messages and further signing each such message with a digital signature. This same client software would also automatically verify the validity of the digital signature and perform sort/filter/highlight/delete functions on incoming mail based on the presence and type of pledge associated with each item of incoming mail. Unsigned mail not containing a pledge would be handled in the usual way, but would become increasingly suspect as adoption of the anti-spam pledge mechanism becomes increasingly prevalent.

Figure 2:
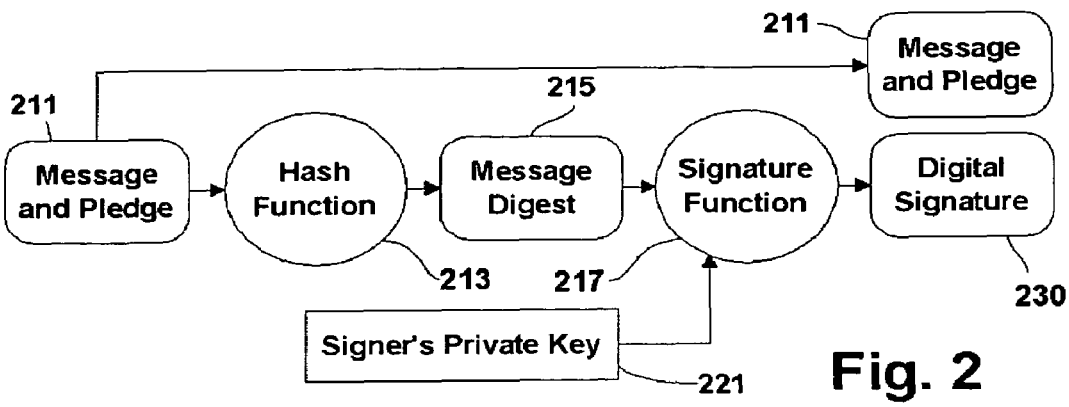
FIG. 2 is a functional block diagram illustrating the manner in which the authenticity of a message and anti-spam pledge may be digitally signed for subsequent verification.
Figure 3:
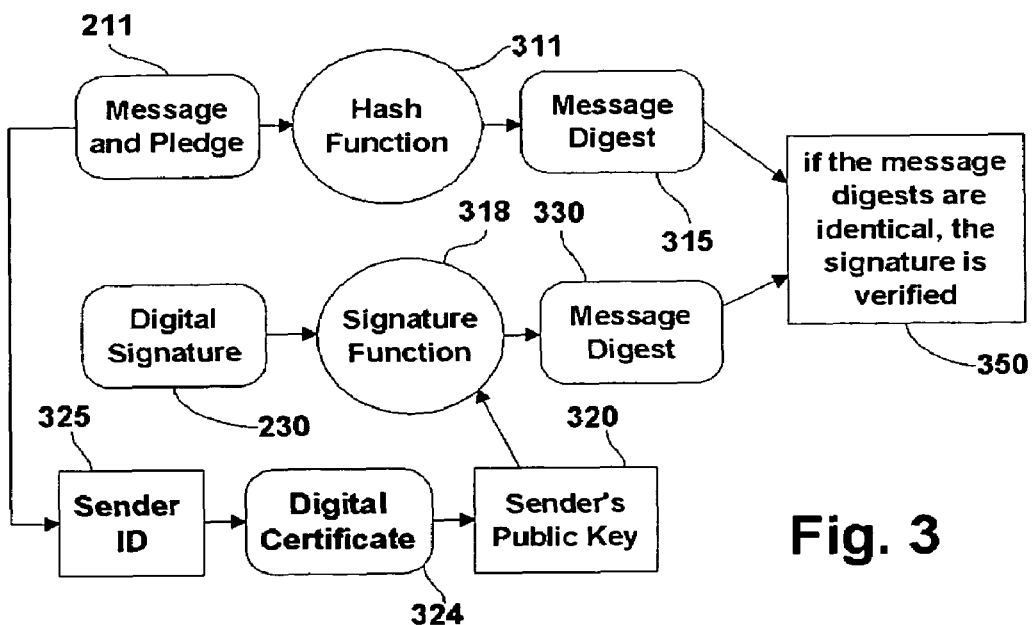
FIG. 3 is a functional block diagram illustrating how an incoming, digitally signed message and pledge are verified.

Digital signatures provide the mechanism needed to prevent those who would circumvent the system from attaching bogus pledges to email when they have no intention of obeying the rules those pledges are intended to ensure. FIGS. 2 and 3 respectively depict the manner in which an outgoing message and pledge are digitally signed, and how the authenticity of the digital signature is verified at the receiving MUA. The text of the outgoing message and pledge 211 are processed using a hash function at 213 to form a message digest 215. The message digest is then encrypted by public key encryption using the signature function 217 to form the digital signature 230 which is sent, with the message and pledge 211, to one or more addressees.

As shown in FIG. 3, when the message and pledge 211 are received, they are processed at 311 (using the same hash function previously used at 213 at the transmitting end) to produce the message digest 315. The digital signature is decrypted by the signature function 318 to reproduce the original message digest at 330. The digests 315 and 330 are compared at 350 and, if they are identical, the authenticity of both the message and pledge 211 is verified as having been sent by the party who is in possession of the private key that corresponds to the sender's public key 320. The public key 320 is obtained from the digital certificate 324 which is identified by the Sender ID 325 contained in the pledge found in the incoming message. The digital certificate 324, if it does not exist in the receiver's local database indexed by Sender ID, may be automatically retrieved from an online repository as discussed below.

With the foregoing description as background, the overall process of controlling spam may now be better understood. This process uses the public key infrastructure and comprises the following steps which are shown graphically in FIG. 4:

As with conventional digital signatures, there is a further need for some "authority" to serve as a trusted third party (TTP) to vouch for individuals' identities, and their relationship to their public keys. This entity, in public key infrastructure (PKI) terminology, is referred to as a certification authority (CA) seen at 403 in FIG. 4. The CA is a trusted third party that issues digital certificates to its subscribers (in this case email senders), binding their identities to the key pairs they use to digitally sign electronic communications.

The present invention may be implemented using conventional digital certificates and conventional processes for issuing digital certificates. Anti-spam digital certificates contain the name (Sender ID) of the sender, the sender's public key, the digital signature of the issuing Certification Authority (CA) shown at 403 in FIG. 4, the issuing CA's public key, and other pertinent information about the sender and his or her organization, including the nature of the sender's promise to follow anti-spam good conduct rules. These certificates should have a default life cycle (e.g., 1 year), and can be revoked upon private key compromise, separation from an organization, etc. The no-spam digital certificates are preferably stored in an on line, publicly accessible repository seen at 405 in FIG. 4. The repository 405 also maintains an up to date listing of all the unexpired certificates which have been revoked, referred to as a certificate revocation list (CRL). The repository also maintains an electronic copy of the certification practice statement (CPS) of each CA that publishes certificates to it. The CPS outlines the policies and procedures of each CA's operations from registration of a subscriber to the physical security surrounding their CA system, and includes the CA's commitment to obtain each sender's binding commitment to observe anti-spam guidelines prior to issuing each anti-spam certificate.

Figure 4:
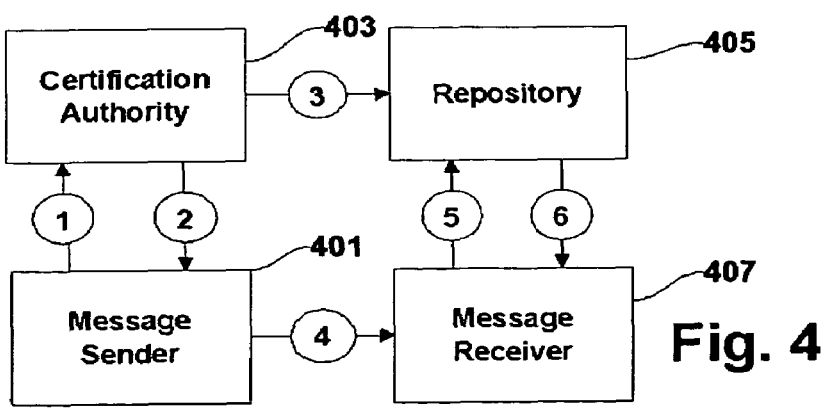
FIG. 4 is a functional block diagram illustrating the information exchange that takes place between email senders, one or more certification authorities, a certificate repository, and email receivers.

As seen in FIG. 4, the process for issuing and using anti-spam digital certificates that use public key encryption which is performed in a series of steps:

Step 1. Sender 401 applies to a Certification Authority 403 for a "No Spam" Digital Certificate and agrees to anti-spam good conduct rules.

Step 2. The Certification Authority 403 verifies identity of sender 401 and issues a "No Spam" Digital Certificate.

Step 3. The Certification Authority 403 publishes Certificate to the public Repository 405.

Step 4. The sender digitally signs each electronic message as described in connection with FIG. 2, thereby ensuring sender authenticity, message and pledge integrity and non-repudiation, as well as the sender's assurance that the message complies with anti-spam policies. The signed message is sent to the message receiver 407 (the relying party), where the incoming message is processed as shown in FIG. 3.

Step 5. The message receiver 407 identifies the presence of a pledge in an incoming signed message and, if necessary, requests a copy of the digital certificate identified in the pledge from the repository 405 (if the needed certificate is not already present in the receiver's cache memory).

Step 6. The receiver 407 uses the public key from the digital certificate retrieved from the repository 405 to validate the authenticity and source of the message and pledge received from the sender as described in FIG. 3.

As with any digital signature system, the effective use of anti-spam signatures imposes certain obligations on the parties involved. The signers of electronic messages must protect their private key from compromise, and if a signer's private key is compromised, he must report it immediately so the CA can revoke his certificate and place it on a CRL. Certification authorities are obligated to use due diligence to verify the identity of their subscribers and their relationship to their public keys, using the same techniques now used by certificate authorities for conventional digital signatures. The CA must also promptly suspend or revoke a certificate at a subscriber's request. Finally, the reliant parties must actually verify the digital signature and check its validity against the current CRL maintained by an on line repository.

It is to be understood that the specific arrangements which have been described are merely illustrative applications of the principles of the invention. Numerous modifications may be made to the methods and apparatus described without departing from the true spirit and scope of the invention.

What is claimed is:

1. The method for identifying unwanted email messages comprising, in combination, the steps of:

at an email transmitting location, forming metadata containing a unique identification of the sender of a given email message and an indication of the number of different recipients to whom an equivalent of said given email message is addressed, said metadata further manifesting a legally binding promise by said sender that the transmission of said given email message conforms to one or more rules of good conduct which prohibit the transmission of unwanted and unsolicited email, and encrypting said given email message and said metadata using a private key value known only to the sender to form a digital signature that is transmitted alone with said given message to said receiving location, and at a receiving location, decrypting said digital signature to validate said message and metadata using a public key value provided by said sender, and presenting said given email message to its intended recipient in a manner that distinguishes said given email from other email messages based on said metadata.

2. The method for identifying unwanted email as set forth in claim 1 wherein said indication of the number of different recipients is formed by comparing said given email messages with a plurality of messages previously transmitted by said sender to identify other email messages that are substantially equivalent to said given email message and forming a combined count of the recipients of said given message and the recipients of each of said messages that are substantially equivalent to said given email message.

3. The method for identifying unwanted email as set forth in claim 2 wherein said indication specifies whether or not said combined count is less than a predetermined threshold count.

4. The method for distinguishing a given email message from unwanted and unsolicited email messages comprising, in combination, the steps performed by or on behalf of the sender of said given mail message comprising:

processing the content of said given email message to form an encrypted digital signature which authenticates the content of said given email message and the identity of the sender of said email message and further manifests a legally binding promise by said sender that said given email message email conforms to one or more rules of good conduct which prohibit the transmission of said unwanted and unsolicited email messages, said step of processing the content of said given message to form an encrypted digital signature comprising, in combination, the substeps of:

obtaining a digital certificate from a certification authority to obtain a private key and a public key, said certification authority publishing said digital certificate which may thereafter be accessed by a recipient to obtain said public key, processing said content of said given email message employing a hash function to form condensed digest of said content; and encrypting said digest using said private key to form said digital signature whereby said recipient may decrypt said digital signature using said public key as verified by said digital certificate to authenticate said message, to confirm the identity of said sender and to verify the existence of said legally binding promise, and transmitting said email message and said digital signature to said recipient.

5. The method for distinguishing a given email message from unwanted and unsolicited email messages as set forth in claim 4 wherein said digital signature manifests a promise by said sender that said given email message or an equivalent thereof have been transmitted to no more than a predetermined number of other recipients.

6. The method for distinguishing a given email message from unwanted and unsolicited email messages as set forth in claim 5 further comprising the step of comparing said email message with other messages previously transmitted by or on behalf of said sender to automatically prevent the transmission of said email message or the equivalent thereof to more than said predetermined number of other recipients.

7. The method for distinguishing a given email message from unwanted and unsolicited email messages as set forth in claim 4 wherein said digital signature manifests a promise by said sender that said given email message does not solicit business or contain advertising.

8. The method for distinguishing a given email message from unwanted and unsolicited email messages as set forth in claim 4 wherein said digital signature manifests a promise by said sender that said sender has sent email messages to no more than a stated number of recipients during a specified period of time.

9. The method for distinguishing a given email, message from unwanted and unsolicited email messages as set forth in claim 4 wherein said digital signature manifests a promise by said sender that said given email message is being sent to said recipient in response to a prior request received from said recipient or a permission granted by said recipient.

10. The method for distinguishing a given email message from unwanted and unsolicited email messages as set forth in claim 4 wherein said digital signature manifests a promise by said sender not to transmit unsolicited email to one or more specified email addresses supplied by a requestor that does not want to receive unsolicited email from said sender directed to said one or more specified email addresses.

11. The method for distinguishing a given email message from unwanted and unsolicited email messages as set forth in claim 4 wherein, as a precondition for obtaining said digital certificate from said certification authority, said sender agrees to obey said one or more rules of good conduct.

12. The method for distinguishing a given email message from unwanted and unsolicited email messages as set forth in claim 11 wherein said digital certificate as published in said repository identifies or describes said legally binding promise by said sender.

13. The method for distinguishing a given email message from unwanted and unsolicited email messages as set forth in claim 4 wherein said content of said message includes data which identifies or describes said legally binding promise.

* * * * *